May 13, 1969  C. B. WENDELL ET AL  3,443,901

HIGH VELOCITY PROCESS FOR MAKING CARBON BLACK

Filed June 27, 1966

United States Patent Office 3,443,901
Patented May 13, 1969

3,443,901
HIGH VELOCITY PROCESS FOR MAKING CARBON BLACK
Charles B. Wendell, Canton, Merrill E. Jordan, Walpole, William G. Burbine, Whitman, and Richard B. Shelvey, Dorchester, Mass., assignors to Cabot Corporation, Boston, Mass., a corporation of Delaware
Filed June 27, 1966, Ser. No. 560,705
Int. Cl. C09c 1/48
U.S. Cl. 23—209.4                9 Claims

ABSTRACT OF THE DISCLOSURE

A substantially adiabatic process is provided for making carbon black in a laterally enclosed, frustoconical shaped, high temperature reaction zone maintained at reaction conditions with the aid of a combustion reaction between a fuel gas and an oxidant gas. In this process the fuel gas and oxidant gas are brought together as currently oriented high velocity spinning streams at the smaller, throat end of said reaction zone after passing at least one of them around the outside of said reaction zone, and then the resultant mixture is burned inside said zone to form a spinning mass of high temperature combustion products moving through said zone as it diverges toward the larger exit end thereof. The main hydrocarbon feedstock is then introduced to said reaction zone as an axial stream at a point intermediate the ends of said frustoconical, reaction zone.

This invention relates to a novel process and apparatus useful in the production of pyrogenic products but especially advantageous for producing carbon black. More particularly the instant invention relates to apparatus for carrying out a novel and substantially adiabatic process for making carbon blacks. This apparatus is extraordinairly versatile with respect to the range of carbon blacks which can be made therewith. For example blacks having characteristics normally attributable to channel blacks, blacks having characteristics normally attributable to furnace blacks, and blacks that are entirely new and possess an exceptional combination of good color properties and controlled, even very high, structure, are all achievable with the apparatus and process of the invention.

Color properties of a carbon black are generally described in terms of "scale." The "scale" of a carbon black is a measure of the masstone or the intenseness of jetness or blackness and is closely related to the particle size thereof. In general, the lower the particle size of a carbon black, the lower its scale and the more intense is the blackness thereof. According to recognized standards of the industry, "high color blacks" are those with scales 70 or below, while the scales of "medium color blacks" run from about 71 to 80 and "regular color blacks" have scales from about 80 to 90.

The term "structure" relates to a primary property of carbon black which is not influenced consistently by any property or combination of properties. In general, the term is used in the art to designate the extent of chainlike aggregation of the primary particles of a black and said aggregation is best evaluated by electron microscope examination. Since all furnace blacks manifest some degree of such aggregation of primary particles, a particular black is classified as being a low, normal or high structure black depending upon the relative degree of aggregation manifested thereby.

Carbon black is presently produced by three major processing techniques, i.e., the channel process, furnace process, and thermal process. In addition there are some less important processes such as processes for producing lamp blacks and acetylene blacks. For the purposes of this application, however, we shall restrict our discussion to channel black manufacture, furnace black manufacture, and thermal black manufacture. Each of these blacks have unique properties which distinguish them from the blacks produced by other methods.

A typical channel black plant is readily identified by the assembly of several hundred sheet metal buildings called hot houses, each some 114–150 feet long, 10–14 feet wide and about 10 feet high. Each such building houses some 2,000–4,000 natural gas flames and the appropriate number of channel irons upon which the flames impinge and deposit carbon. Air is applied through openings of the base of each building and gases are exhausted through vents in the roof. The flame tips generally burn 2–3 cubic feet of gas per hour and are spaced at 3 to 5 inch intervals along a gas supply pipe. Blacks are generally poduced by the channel process at temperatures ranging from 3000 to 3500° F. and such blacks usually have an apparent density of about 5 pounds per cubic foot. By agitation, this density may be increased to around 8 to 14 pounds per cubic foot. These blacks have high rubber reinforcing ability and exteremely good color intensity. The most intense color is obtained with blacks having a diameter of about 90 Angstroms, and the intenseness of the color gradually decreases as the particle diameter increases. However, the yield in the channel process is small with only about 5 to 10% of the available carbon recovered in the manufacture of rubber grades of lower quality. This yield may drop to less than 1% in the manufacture of the finer particle sizes having the highest color properties. Accordingly, the channel process requires abundant supplies of cheap natural gas for economic operation. As the economics of natural gas as a raw material for carbon black production become less favorable, it becomes more desirable to attempt to duplicate or improve the properties of channel black by other processes.

The furnace process can be operated using either an oil or a gas as the primary raw material and of course there are some differences in the methods of operation. However, for the purposes of this disclosure, an oil furnace process is described because this process is by far the more important process, producing about 75% of all carbon black. This black is produced in refractory-lined metal furnaces, typically 5–15 feet in length and 6–30 inches in internal diameter.

Normally auxiliary gas, either refinery or natural gas, is burned to completion with auxiliary air, forming a zone of combustion gases into which oil which has been preheated to 400° F. or 500° F. is vaporized or atomized.

The furnace blacks are produced at temperatures generally ranging from 2500 to 3000° F. and the hot combustion gases and suspended carbon produced therein are rapidly quenched by water sprays. The black is removed from the gas stream by cyclone collectors or other such solids-gas separation apparatus.

Based on the amount of oil fed into the furnace, about 35–75% of the available carbon is recovered as carbon black, the lower yields are realized in producing the smallest particle size reinforcing grades, i.e., the grades having the lowest scale. The scale of furnace blacks is uniformly higher for blacks produced by the furnace process than for those produced by the channel process described above. Moreover, higher structure as determined by ability to reinforce rubber, is far greater in the blacks produced in the furnace process than by the channel process.

The thermal process need only be briefly discussed here because products thereby are normally utilized in quite different applications than the products of either the channel or the furnace processes. This is because thermal blacks have a much larger particle size than either channel or furnace blacks, less rubber reinforcing ability than either channel or furnace blacks, and relatively poor color properties. What makes the thermal blacks useful at all is the fact that their low surface area and spherical particle shape adapts them for easy incorporation in elastomers and use as fillers. Other types of carbon black cannot be incorporated into plastics in anywhere near the high loadings obtainable by use of thermal blacks.

The thermal processes are carried out in the absence of oxygen and flame. This is accomplished by heating the internal walls of a furnace to a red heat by combustion of natural gas therein, then ceasing combustion of natural gas, and feeding a hydrocarbon into the hot furnace which hydrocarbon is cracked on contact with the hot walls of the furnace to form thermal blacks. Yields are high in view of the amount of carbon lost as hydrocarbon effluent in stock gas and lost in adherence to furnace walls. Normally, the yields run from about 40 to 50%.

It is seen from the above that each carbon black process produces a black having particularly distinguishable physical properties and also that each process has distinguishable economic limitations.

It has long been desired by the carbon black producers to match or approach the color properties achieved with the channel blacks by means of a process having the economic advantages in respect to yield and operating costs that are achieved with the furnace and thermal black processes. Moreover, it has been especially desirable that such a black, having good color properties, also have reinforcing properties making it useful, not only in applications formerly suitable for channel blacks, but also in applications requiring a higher degree of chemical interaction or of structure which at the present time must be satisfied by the use of furnace blacks of inferior color characteristics.

Therefore, it is a principal object of the instant invention to provide a process for producing large quantities of versatile carbon blacks having good color characteristics and good reinforcing characteristics.

It is a further object of the invention to provide a process whereby advantageous yields are realized in producing blacks with excellent color characteristics.

Another object of the invention is to provied novel carbon blacks of good color and having excellent reinforcing properties.

A further object of the invention is to provide apparatus whereby the novel processes may be carried out and whereby the novel product of the invention may be prepared in excellent yields.

Another object of the invention is to rovide a good spatial separation of the combustion and cracking functions of a carbon black reactor within a relatively small apparatus.

It is another object of the invention to provide a process whereby carbon black may be produced with excellent heat conservation.

Another object of the invention is to provide apparatus and process for producing pyrogenic solids, generally.

Other objects of the invention will be in part obvious from the following description and in part set out specifically below.

Applicants have substantially achieved these objects by the utilization of apparatus whereby hydrocarbon feedstock is injected into a very hot turbulent zone of high velocity combustion products and the resulting mass passes into a quench zone. The combustion products are desirably at about 4000–5200° F. and preferably in the range of 4750 to 5000° F. at a point just before make fuel is added thereto. This temperature is conveniently reached by use of a relatively small amount of inert gas in the combustion zone. Thus, air, if used, should preferably be enriched with an oxidant.

In the specification and in the accompanying drawings are shown and described an illustrative embodiment of the invention; modifications thereof are indicated, but it is to be understood that these are not intended to be exhaustive nor limiting of the invetnion, but on the contrary are given for the purposes of illustration in order that others skilled in the art may fully understand the invention and manner of applying it in practical applications. The various objects, aspects and advantages of the present invention will be more fully understood from a consideration of the specification in conjunction with the accompanying drawings. For example, although the axial probe described below is adapted to bifluid atomization, pressure atomization-type probes known to the art may also be used effectively.

Figure 1:
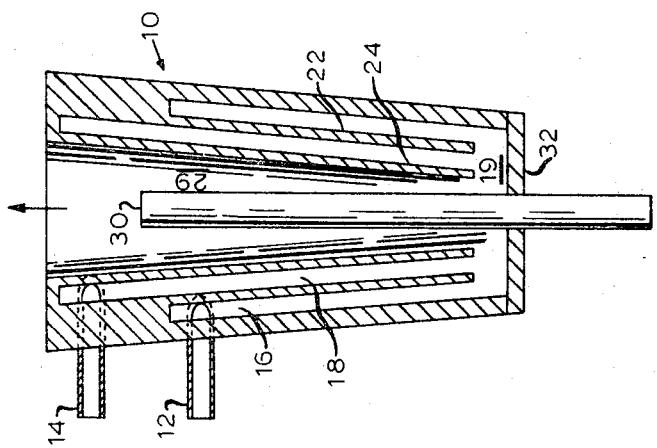
FIGURE 1 is a section of a burner of the instant invention.

Referring to FIGURE 1, it is seen that the apparatus described therein is a burner 10 having two tangential entry ports 12 and 14. These ports 12 and 14 feed into two concentric annular frustoconical flow paths 16 and 18 respectively. Flow paths 16 and 18 discharge concurrently into throat mixing section 19 of burner 10. Walls 24 and 22 of burner 10 diverge upwardly at an angle of about 7½ degrees with the vertical.

A feed probe 30 entering through the backing plate 32 of burner 10 is mounted axially in combusion chamber 29.

Figure 2:
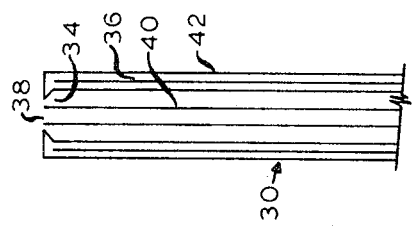
FIGURE 2 is a more detailed view, in section, of an oil probe useful with the burner shown in FIGURE 1.

As seen more celarly, but still schematically, in FIG. 2, probe 30 comprises three separate flow paths 34, 36 and 38. Flow path 38 (normally the path for a carbon black make oil) is formed by inner conduit 40. Flow path 34, normally the path for some oil-atomizing fluid, is formed in the annulus between inner condiut 40 and outer conduit 42. Flow path 36 wholly within conduit 42 forms means for circulating a coolant into conduit 42 to the extent necessary to avoid the thermal deterioration thereof.

In a typical embodiment of the apparatus shown in FIGURES 1 and 2, an apparatus capable of handling 10 gallons per hour and more of carbon black make oil with good production efficiency, typical dimensions are as follows:

| | Inches |
|---|---|
| Width of flow path 38 | .040 |
| Width of flow path 34 | .010 |
| Outside diameter of conduit 42 | ⅜ |
| Distance of probe 30 from outlet of burner 10 | ½ to 1 |
| Overall length of wall 24 | 3 |
| Overall length of wall 22 | 2¼ |
| Width of flow paths 16 and 18 | .125 and .0625 |

The furnace is six inches in diameter and of round cross section and eight feet in length. The quench spray was placed about 60 inches from the burner end of the furnace.

Figure 3:
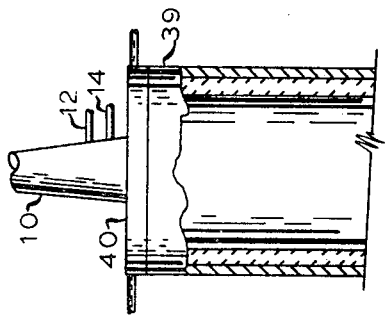
FIGURE 3 shows the burner of the invention in combination with a refractory furnace.

Referring to FIGURE 3, burner 10 is mounted adjacent to furnace 39 by means of a water-cooled transition member 40.

In an operation for manufacturing carbon black, an oxidizer and fuel are inserted into supply pipes 12 and 14. The choice of which reactant enters which pipe is normally unimportant, but at relatively low rates of throughput, the choice is dependent on relative volume and the heat-absorbing properties of the stream of fuel or oxidizer.

At such low throughput rates the oxidizer stream, for example, oxygen, will usually be chosen for the inner path 18 in order to achieve the greater heat transfer from the combustion through wall 24 afforded by the larger volume stream.

The oxidizer and fuel, because of their concurrent and tangential entry into paths 16 and 18, follow a helicoidal path therethrough until they emerge at the narrowest section of the combustion chamber 29. An extremely high gas velocity preferably of the order of 1500 to 3000 feet per second or more is reached at this narrow section, or throat 19, of the combustion zone 29. The attainable velocity of the combustion products past the oil outlet port in probe 30 is also high at least 500 to 1700 feet per second. Such velocities are reached because of a recirculation flow pattern inside the combustion chamber 29. These velocities correspond to about a Mach No. range of 0.2 to 0.5 within the temperature range of 4000 to 5000° F. These velocities combined with high temperature of from about 4000 to 5200° F. into which the oil is preferably discharged are believed to be in large part responsible for the advantageous properties of blacks formed by the invention. Furthermore, an excellent mixing of fuel and oxidizer is obtained under such conditions as to create a turbulent mass of hot combustion gases. Oil feedstock fed through inner conduit 32 is atomized by gas, such as oxygen carried in conduit 34. Water is circulated through conduit 36 providing a cooling jacket for the atomization gas and oil feedstock.

Excellent carbon black has been made in the described burner at oil rates of up to 15 gallons per hour. The particular advantages achieved by processes carried out on the instant apparatus is believed in large part assignable to its excellent heat-conservation characteristics. This characteristic is achieved by imparting a high tangential velocity to gases entering the burner chamber through flow paths 16 and 18 and throat section 19. At relatively higher velocities, a portion of these gases tend to form a gas layer against the walls bordering combustion chamber 29 and thereby tend to insulate these walls against the heat generated by any combustion reaction being carried out in chamber 29. The high throughput allows operation of the process at relatively high carbon concentrations. For example, the percent of carbon atoms based on all the atoms admitted to the burner may exceed 15%. Such high concentrations have been found to be of special importance in achieving the objects of the invention.

At relatively lower velocities, the gas insulating effect at the walls bordering combustion chamber 29 is not realized; however, the gases flowing through flow path 18 and sometimes flow path 16 also are then preheated to conserve the adiabatic heat characteristic of burner 10.

The following specific working examples are illustrative of the process of the instant invention and its versatility in respect to the products produced thereby. The term "percent combustion" referred to in the working examples below is, as will be understood by those skilled in the art, a measure of the oxygen made available during a given run based on the amount of oxygen necessary to satisfy the complete oxidation of hydrocarbons present to carbon dioxide and water.

EXAMPLE 1

Into the apparatus described above were fed 510 cubic feet per hour of oxygen, 490 cubic feet per hour of nitrogen, and 260 cubic feet per hour of natural gas. The oxygen and nitrogen were fed through the flow path nearest to the combustion chamber. 6.5 gallons per hour of a hydrocarbon oil feedstock sold under the trade designation Aromatic HB was fed into the combustion chamber and atomized into the combustion products formed by the reaction of oxygen with the fuel gas. Flow rate of quench water was 9.0 gallons per hour. The characteristics of the carbon black product obtained is described below. The black is identified as Black No. 1. Percent combustion was 32.2.

EXAMPLE 2

Into the apparatus described above were fed 510 cubic feet per hour of oxygen, 490 cubic feet per hour of nitrogen, and 260 cubic feet per hour of natural gas. The oxygen and nitrogen were fed through the flow path nearest to the combustion chamber. 6.5 gallons per hour of a hydrocarbon oil feedstock sold under the trade designation Aromatic HB was fed into the combustion chamber and atomized into the combustion products formed by the reaction of oxygen with the fuel gas. Flow rate of quench water was 9.0 gallons per hour. The characteristics of the carbon black product obtained is described below. The black is identified as Black No. 2. Percent combustion was 21.8.

EXAMPLE 3

Into the apparatus described above were fed 522 cubic feet per hour of oxygen, 548 cubic feet per hour of nitrogen, and 260 cubic feet per hour of natural gas. The oxygen and nitrogen were fed through the flow path nearest to the combustion chamber. 5.5 gallons per hour of a hydrocarbon oil feedstock sold under the trade designation Aromatic HB was fed into the combustion chamber and atomized into the combustion products formed by the reaction of oxygen with the fuel gas. Fifty-five cubic feet per hour of air were used as atomizing gas. Flow rate of quench water was 10.2 gallons per hour. The characteristics of the carbon black product obtained is described below. The black is identified as Black No. 3. Percent combustion was 28.1.

EXAMPLE 4

Into the apparatus described above were fed 523 cubic feet per hour of oxygen, 553 cubic feet per hour of nitrogen, and 260 cubic feet per hour of natural gas. The oxygen and nitrogen were fed through the flow path nearest to the combustion chamber. 3.5 gallons per hour of a hydrocarbon oil feedstock sold under the trade designation Aromatic HB was fed into the combustion chamber and atomized into the combustion products formed by the reaction of oxygen with the fuel gas. Fifty-five cubic feet per hour of air were used as atomizing gas. Flow rate of quench water was 10.5 gallons per hour. The characteristics of the carbon black product obtained is described below. The black is identified as Black No. 4. Percent combustion was 38.6.

EXAMPLE 5

Into the apparatus described above were fed 576 cubic feet per hour of oxygen, 500 cubic feet per hour of nitrogen, and 260 cubic feet per hour of natural gas. The oxygen and nitrogen were fed through the flow path nearest to the combustion chamber. 5.0 gallons per hour of a hydrocarbon oil feedstock sold under the trade designation Aromatic HB was fed into the combustion chamber and atomized into the combustion products formed by the reaction of oxygen with the fuel gas. 60 cubic feet per hour of oxygen were used as atomizing gas. Flow rate of quench water was 9.5 gallons per hour. The characteristics of the carbon black product obtained is described below. The black is identified as Black No. 5. Percent combustion was 32.8.

EXAMPLE 6

Into the apparatus described above were fed 800 cubic feet per hour of oxygen, 840 cubic feet per hour of nitrogen, and 400 cubic feet per hour of natural gas. The oxygen and nitrogen were fed through the flow path nearest to the combustion chamber. 4.0 gallons per hour of a hydrocarbon oil feedstock sold under the trade designation Aromatic HB was fed into the combustion chamber and atomized into the combustion products formed by the reaction of oxygen with the fuel gas. Sixty-six cubic feet per hour of oxygen were used as atomizing gas. Flow rate of quench water was 16.0 gallons per hour. The characteristics of the carbon black product obtained is described below. The black is identified as Black No. 6. Percent combustion was 45.

EXAMPLE 7

Into the apparatus described above were fed 600 cubic feet per hour of oxygen, 600 cubic feet per hour of nitrogen, and 300 cubic feet per hour of natural gas. The oxygen and nitrogen were fed through the flow path nearest to the combustion chamber. 7.5 gallons per hour of a hydrocarbon oil feedstock sold under the trade designation Aromatic HB was fed into the combustion chamber and atomized into the combustion products formed by the reaction of oxygen with the fuel gas. 240 cubic feet per hour of oxygen were used as atomiziging gas. Flow rate of quench water was 12.5 gallons per hour. The characteristics of the carbon black product obtained is described below. The black is identified as Black No. 7. Percent combustion was 30.9.

EXAMPLE 8

Into the apparatus described above were fed 510 cubic feet per hour of oxygen, 500 cubic feet per hour of nitrogen, and 260 cubic feet per hour of natural gas. The oxygen and nitrogen were fed through the flow path nearest to the combustion chamber. 3.4 gallons per hour of hydrocarbon oil feedstock sold under the trade designation Aromatic HB was fed into the combustion chamber and atomized into the combustion products formed by the reaction of oxygen with the fuel gas. 60 cubic feet per hour of oxygen were used as atomizing gas. Flow rate of quench water was 9.5 gallons per hour. The characteristics of the carbon black product obtained is described below. The black is identified as Black No. 8. Percent combustion was 38.4.

Table I below includes analytical data relating to the carbon blacks produced in the above working examples.

Diphenylguanidine adsorption of a carbon black is a measure of the surface activity of the black. In determining this property, a solution of 100 grams of 0.001 normal diphenylguanidine in benzol is shaken with one gram of the carbon black to be tested for 30 minutes. Then the black is allowed to settle and the clear solution is titrated with a 0.002 normal solution of hydrochloric acid in methanol to determine the decrease in diphenylguanidine concentration and thusly the quantity of diphenylguanidine absorbed on the black.

Extract is that weight fraction of carbon black which may be removed from a carbon black sample over a 22 hour extraction period in benzene. To determine extract, about 2 to 6 grams of black are dispersed in about 50 ml. benzene and heated to reflux. The heat input is such as to allow a reflux rate of about one ml. of benzene per minute during the 22-hour extraction period. After the extraction period, the benzene residue is evaporated until about one ml. volume remains. This one ml. remainder is then heated slowly until the temperature thereof rises to 85° C.; the residue is "extract."

Surface area as measured by absorption of nitrogen gas is primarily, for blacks of a given diameter, a measure of the porosity or "internal surface" area of the black tested. The test utilized is the standard Brunauer-Emmett-Teller test known to the art.

Occasionally, however, it is more convenient to use an iodine-absorption test to measure surface area. This

TABLE I

| | Scale | Volatile | pH | Absorption DPG | Absorption DBP | Extract | Area ($N_2$) | Tint |
|---|---|---|---|---|---|---|---|---|
| Black No. 1 | 91.5 | 1.3 | 7.0 | 6.7 | 183 | 1.3 | 54 | 158 |
| Black No. 2 | 90.0 | 1.3 | 7.2 | 10.9 | 175 | 0.4 | 68 | 180 |
| Black No. 3 | 87.5 | 1.2 | 7.3 | 11.9 | 163 | 0.65 | 82 | 188 |
| Black No. 4 | 85.5 | 1.8 | 8.2 | 16.5 | 147 | 0.02 | 137 | 194 |
| Black No. 5 | 84.0 | 1.5 | 8.4 | | 155 | 0.27 | 163 | |
| Black No. 6 | 70.9 | 2.1 | 6.5 | 45.8 | 168 | 0.15 | 424 | 185 |
| Black No. 7 | 92 | 2.4 | 7.3 | 2.7 | 133 | 1.3 | 4.36 | 165 |
| Black No. 8 | 74 | | | | | 0.0 | | |

For the puruposes of comparison, a number of typical commercial carbon blacks are set forth in Table II below. Also included in Table II is an acetylene black.

is widely used as a control test for surface area and is also known in the art. The procedure is rapid and convenient. Within a given family of blacks the correlation

TABLE II.—ANALYTICAL PROPERTIES OF CARBON BLACK

| Black | Bound rubber | Scale | S.A. (m.²/g.) | Vol. Percent | pH | Ext. | Tint | DBP (g./100 g.) |
|---|---|---|---|---|---|---|---|---|
| Regal 300 (CRF) | 16.7 | 87 | 79.4 | .74 | 6.8 | .08 | 222 | 74 |
| Vulcan 3 (HAF) | 20.0 | 90 | 75.3 | 1.0 | | | 206 | ¹ 1.21 |
| Vulcan 3H (HAF) | 23.6 | | 76.2 | 1.34 | 7.8 | .09 | 204 | 132 |
| Vulcan 9 (SAF) | 27.5 | 84.7 | ² 112.2 | 1.32 | 6.6 | .04 | 243 | ¹ 1.34 |
| Vulcan XC72 (XCF) | 21.5 | 92.4 | ² 199 | 1.84 | 6.5 | .22 | 143 | ³ 204 |
| Acetylene | 12.7 | 94.5 | 52 | | 4.0 | | 86 | ³ 302 |
| Sterling SO (FEF) | 15.2 | 95 | 40.4 | 0.55 | 8.3 | 0.2 | 130 | 118 |
| Spheron 9 (EPG) | 18.0 | 84 | 105 | 5.0 | 4.5 | | 180 | 101.5 |

¹ Oil absorption.  ² Iodine value.  ³ For 8-gram sample (rather than 20 gram).

A discussion of the test methods used in compiling the data for Tables I and II follows:

Scale value is an evaluation of intensity of light reflected by a mixture of a given carbon black with an oil dispersion in terms of a standard. Scale values decrease with increasing blackness or decreasing particle size. The relation between scale values and particle size is known to those skilled in the art and is further described in the section on carbon black of the Encyclopedia of Chemical Technology, Interscience, New York, 1964.

Volatile content is determined by ASTM test method D1620-60.

The ditutyl phthalate absorption characteristics of carbon black indicate, for particles of a given size, the amount of structure, i.e., chaining, of primary particles. Dibutyl phthalate is mixed with about 20 grams of black (15 grams in the case of the acetylene black) until the transition from a free-flowing powder to a semiplastic agglomerate results in a sharp increase in viscosity of the mix. An ASTM tentative test specification D2414 appears in the Report of the Committee on Carbon Black, June 1965.

of the iodine surface area values with those obtained by the nitrogen test is good. The ASTM has provided a standard procedure for this iodine-absorption test under designation D1510-60. This procedure provides results in terms of milligrams of iodine adsorbed per gram of black which can then be correlated with approximate surface area in square meters per gram.

Tint is a characteristic of carbon black which defines its covering power. Tint is conveniently measured by mixing 0.1000 gram of carbon black to be tested with 3.0000 grams of a zinc oxide such as that sold under the trade name Florence Green Seal 8 by New Jersey Zinc Company, incorporating the dry mixture with 1.2000 grams of linseed oil, into a paste, forming a film 0.0015" thick with the paste, and then measuring the light transmission of the film with a Welsh Densichron. This instrument is known to the art and is commercially available from the W. M. Welch Manufacturing Company.

Blacks prepared according to the process of the invention were compounded in a styrene-butadiene rubber formulation as set forth below in Table III.

TABLE III

| | Parts by wt. |
|---|---|
| SBR–1500 | 100 |
| Carbon black | 50 |
| Zinc oxide | 3 |
| Stearic acid | 1.5 |
| Softener mix | 8 |
| Flexamine | 1 |
| Sulfur | 1.75 |
| Santocure | 1.25 |

In the above formulation, SBR–1500 is a rubber grade known to the art; the softener mix comprises equal parts of a naphthenic oil sold under the trade designation Cercosol 42XH by Sun Oil Company and a saturated polymeric petroleum hydrocarbon sold under the trade name Paraplex by C. P. Hall Company; Flexamine is a trade designation of an antioxidant sold by U.S. Rubber Company, and Santocure is a rubber accelerator sold by Monsanto Company.

Vulcan 3, an HAF black, was also compounded with SBR–1500 in like manner for purposes of comparison with the blacks of the invention. Results of the comparison are shown in Table IV.

TABLE IV.—RUBBER DATA[1]

| Black | Extrusion shrinkage | Modulus | | Tensile | | Shore A2 hardness | Abrasion loss |
|---|---|---|---|---|---|---|---|
| | | 25% | 300% | 40% | 80% | | |
| Black No. 1 | 86 | 124 | 145 | 100 | 92.5 | 112 | 87 |
| Black No. 2 | 86 | 138 | 139 | 101 | 99 | 109 | 87 |
| Black No. 3 | 86 | 138 | 148 | 107 | 106 | 109 | 80 |
| Black No. 4 | 93 | 135 | 111 | 113 | 110 | 112 | 68 |
| Black No. 5 | 91.4 | 124 | 100 | 105 | 103 | 110 | 84.5 |

[1] Values for rubber data are represented as a percent of Vulcan 3 control.

A discussion of the test methods used in compiling the data for Table IV follows:

Extrusion shrinkage was measured by extruding a sample of stock three consecutive times through a 0.1875 inch orifice of an extruder having a 1 3/16 inch screw. Screw speed is normally 60 r.p.m. The extruder used for the above testing may be identified as a Royle No. ½. The extrusion shrinkage is a measure of the diametrical swelling of the rubber sample as it moves through the extruder die at an approximate stock temperature of 170° F. and a die temperature of about 155° F.

The hardness value was obtained according to ASTM test D676.

Abrasion resistance is obtained using the Akron standard angle abrader, well known in the art and available from the Akron Standard Mold Company. The abrading stone utilized is an Aloxite stone of grit designation A46–06–V–30 and size designation 6" x 1" x 1"; this stone is sold under the trade name Aloxite by the Carborundum Company. For the purposes of the test, the stone is operated at 74 r.p.m. and 8.53 kilograms force is exerted by the stone on the sample. The specimen to be tested is placed on the abrasion machine shaft set at a 15° angle to the axis of the stone and the results, i.e., the index number, reported above is $$\frac{\text{Average loss in weight of two Wheels}}{\text{No. revolutions} \times \text{specific gravity}} \times 10^6$$

The data presented in Table IV clearly shows that blacks produced by the process of the invention can contribute superior extrusion shrinkage and abrasion properties to rubber formulations while maintaining good tensile properties and higher modulus of the rubber composition. That such properties may be achieved with blacks having far lower scales than the HAF black, Vulcan 3, with which they are being compared, is an important advantage.

Black Nos. 3 through 6 have scales ranging between 79 and 87.5 and are vastly superior to Vulcan 3 in color properties. Vulcan 3 has a scale of 90.

A particularly good illustration of the versatility of the instant process is its ability to produce blacks having combinations of properties long sought in the art but which combinations were not heretofore attainable by any commercially feasible means, if attainable at all. For example, it has long been desired to have a carbon black possessing the low surface area of an SRF black, the low scale of an HAF black and the structure characteristics of an FEF black. Such a black has been more closely approximated by the process of the invention described in working Example 7.

To explain the achievement in more detail, it is convenient to synthesize a relationship S relating the DBP absorption scale, and nitrogen surface area of carbon blacks. This relationship, best expressing the attributes of good color and high structure in respect to the entire spectrum of commercial carbon blacks is defined as follows:

$$S = \frac{\text{DBP absorption}}{\text{Scale} \times \text{surface area}}$$

The use of a surface area function in the denominator of the relationship provides means to partially correct the relationship for DBP absorptions which are made deceptively high by carbon blacks having extremely large surface areas which surface areas provide a sufficiently receptive surface for DBP to distort the DBP absorption value with respect to its use as a measure of chaining or structure of the black. Channel blacks are the more important of such high-area blacks; high DBP values in channel blacks do not usually mean proportionally high structure.

For a black having the surface area of an SRF black, the scale of an HAF black (say about 90) and the structure of an FEF black, S would be in the range of about $5 \times 10^{-2}$. This would represent an extraordinary black. To illustrate this more clearly, it may be noted that channel blacks have a range of S values of from about $1.0 \times 10^{-2}$ to $0.35 \times 10^{-2}$; commercial furnace blacks have a range of S values of from about $1 \times 10^{-2}$ to $1.8 \times 10^{-2}$ and thermal blacks have a range of S values extending from about $2.5 \times 10^{-2}$ upwards to about $3.5 \times 10^{-2}$. It will be readily apparent to all skilled in the art that the S value is increased only at a great sacrifice in color-value, i.e., scale of black. For example, the thermal black having an S value of about $3.2 \times 10^{-2}$ has a scale of 110 indicating very poor coloring properties. On the other hand, a typical channel black having a value of about $0.65 \times 10^{-2}$ has a scale of 69.

Therefore it is particularly important to realize not only the fact that applicants have, by the process of the invention not only produced blacks having S values not heretofore attainable, but have produced such blacks having color values in the scale range of 92 and below, i.e., the scale range of conventional furnace and even channel blacks.

To illustrate this fact, the following list of S values possessed by the Black Nos. 1 through 7 are set out below:

|  | S | Scale |
|---|---|---|
| Black No. 1 | $3.7 \times 10^{-2}$ | 91.5 |
| Black No. 2 | $2.7 \times 10^{-2}$ | 90.0 |
| Black No. 3 | $2.4 \times 10^{-2}$ | 87.5 |
| Black No. 4 | $1.3 \times 10^{-2}$ | 85.5 |
| Black No. 5 | $1.1 \times 10^{-2}$ | 84.0 |
| Black No. 6 | $0.5 \times 10^{-2}$ | 79.0 |
| Black No. 7 | $3.6 \times 10^{-2}$ | 92 |

No other non-aftertreated blacks are believed to possess S factors over about 2, excepting blacks which have poor color properties as indicated by scale values over 100.

Blacks of such desirable physical properties have not previously been known. Even had such blacks been conceived as possible, no process existed for making them until the instant invention.

The blacks according to the invention are also characterized by a peculiar crystalline structure. The distance between parallel carbon planes ($L_c$) is unusually low. The average diameter (taken parallel to the carbon planes and called $L_a$) is rather high. Whereas the ratios of $L_a$ to $L_c$ is, for conventional carbon blacks, about 2 or less, the ratio for blacks produced according to the invention may be up to 5 or more. This is particularly true where "percent combustion" is high. The following table is illustrative of the broad range of microstructures of blacks prepared according to the invention.

|  | Percent Combustion | $L_c$ | $L_a$ |
|---|---|---|---|
| Black No. 1 | 32.2 | 15.2 | 35.7 |
| Black No. 2 | 21.8 | 14.6 | 35.3 |
| Black No. 3 | 38.6 | 14.11 | 33.55 |
| Black No. 4 | 32.8 | 12.6 | 31.17 |
| Black No. 5 | 45.0 | 9.43 | 32.74 |
| Black No. 6 | 30.9 | 15.2 | 30.6 |

While an aromatic oil feedstock having the trade name Aromatic HB was used in the working examples for the purposes of facilitating comparison of these examples, it will be understood by those skilled in the art that a large number of other hydrocarbon fuels can also be used in the process of the invention. Of course, the vaporizable aromatic oils heavier than the naphthas of which Aromatic HB is typical are preferred in most circumstances, but where local economics or other special conditions make the use thereof desirable, naphtha and diesel oil-type fuels may be utilized. The use of propylene and the like can also advantageously be utilized as carbon black make fuels. These fuels can be most efficiently and advantageously utilized when preheated before injection into the apparatus of the invention.

Aromatic HB is a typical carbon black make oil. An analysis of an Aromatic HB sample follows.

| | |
|---|---|
| A.P.I. gravity | +13.1 |
| Viscosity, S.S.U. (130° F.) | 33 |
| Viscosity, S.S.U. (210° F.) | 31 |
| Percent asphaltenes | 0.12 |
| Percent ash | 0.002 |
| Percent sulfur | 0.15 |
| H/C ratio | 1.15 |

Percent distilled: Boiling point, ° F.

| | |
|---|---|
| Initial boiling point | 419 |
| 10 | 443 |
| 20 | 447 |
| 30 | 450 |
| 40 | 455 |
| 50 | 459 |
| 60 | 466 |
| 70 | 472 |
| 80 | 480 |
| 90 | 498 |
| End point | 550 |

The apparatus of the invention is not restricted to use with carbon black manufacturing operations which utilize oxygen alone or oxygen-enriched gases as a combustion-support reactant, although it is to be noted that this type of operation is particularly advantageous for the formation of the novel carbon blacks described above. Particular advantages accrue from the fact that the yields of an oxygen-fired process are much less sensitive to flame temperature than the yields of an air-fired furnace process. Furthermore, preheat is more efficiently utilized in oxygen-fired processes. It has also been found, however, that product yields are more sensitive to heat of formation of the hydrocarbon make material when oxygen or oxygen-enriched air is used.

Those skilled in the art will understand that the general considerations set forth in the foregoing paragraph apply not only to oxygen but to ozone, chlorine, and other oxidants generally when the process of the invention is adapted to their utilization.

The foregoing emphasis on carbon black as a principal product of the instant invention should not be construed as limiting the application of the apparatus disclosed herein. Indeed advantageous use of the apparatus and process of the invention has been made to produce such pyrogenic products as metal oxides. In such a process a decomposable metal-bearing liquid is injected into the axial probe 30. In one such example, 10 gallons per hour of titanium tetrachloride were injected through probe 30 while 800 standard cubic feet of CO and 800 standard cubic feet of oxygen were fed through the outer and inner annuli and mixed in the throat of the burner. The collected product was identified as titanium oxide.

What is claimed is:

1. A process for making carbon black under substantially adiabatic conditions in a laterally enclosed, frusto-conical shaped, high temperature reaction zone maintained at reaction conditions with the aid of a combustion reaction conducted therein between a fuel gas and an oxidant gas comprising
   (a) passing at least one of said gases through a narrow annular passageway surrounding said reaction zone;
   (b) bringing said oxidant gas and said fuel gas together by introducing them into said reaction zone as separate concurrently oriented, high velocity spinning streams at the smaller, throat end of said reaction zone;
   (c) burning the resulting mixture to form a high velocity spinning mass of high temperature combustion gases moving through said reaction zone diverging toward the larger downstream end thereof;
   (d) introducing into the center of said spinning mass of combustion gases as it moves along the intermediate portion of said diverging frusto-conical reaction zone an axial stream of liquid hydrocarbon feedstock; and
   (e) collecting the carbon black produced by the thermal decomposition of said hydrocarbon feedstock in the composite reaction mass passing out of the larger end of said reaction zone.

2. A process as defined in claim 1 wherein said liquid hydrocarbon feedstock is introduced into said hot combustion zone after said zone has reached a temperature of over about 4000° F.

3. A process as in claim 1 wherein the theoretical overall "percent combustion" is over about 30.

4. A process as in claim 1 wherein the theoretical overall "percent combustion" is over about 40.

5. A process as defined in claim 1 wherein the velocity of said spinning mass of combustion gases is at least 500 feet per second at the point where said liquid hydrocarbon feedstock is introduced.

6. A process as defined in claim 1 wherein said oxidant gas is chosen from the group consisting of oxygen and oxygen-enriched air.

7. A process as defined in claim 1 wherein the gas velocities at the smaller throat end of said reaction zone are of the order of 1500 to 3000 feet per second.

8. A process as defined in claim 1 wherein the axial stream of liquid hydrocarbon feedstock is introduced through an elongated probe the walls of which are internally cooled by a flowing stream of water.

9. A process as defined in claim 1 wherein the oxidant gas is composed of at least about 50% by volume molecular oxygen.

References Cited

UNITED STATES PATENTS

| | | | |
|---|---|---|---|
| 2,623,811 | 12/1952 | Williams | 23—209.6 |
| 2,769,692 | 11/1956 | Heller | 23—209.4 |
| 2,851,337 | 9/1958 | Heller | 23—209.4 |
| 3,256,065 | 6/1966 | Latham | 23—209.4 X |
| 3,256,066 | 6/1966 | Higgins | 23—209.4 X |

EDWARD J. MEROS, *Primary Examiner.*

U.S. Cl. X.R.

23—1, 259.5, 277

U.S. PATENT OFFICE

UNITED STATES PATENT OFFICE

CERTIFICATE OF CORRECTION

Patent No. 3,443,901            Dated May 13, 1969

Charles B. Wendell et al.

It is certified that error appears in the above-identified patent and that said Letters Patent are hereby corrected as shown below:

Column 2, line 17, "poduced" should be -- produced --; Column 2, line 22, "exteremely" should be -- extremely --. Column 3, line 45, "provied" should be -- provide --; Column 3, line 52, "rovide" should be -- provide --. Column 4, line 4, "invetnion" should be -- invention --; Column 4, line 33, "celarly" should be -- clearly --; Column 4, line 37, "condiut" should be -- conduit --. Table I, under the column SCALE, "70.9" should be -- 79.0 --; Table I, under the column AREA ($N_2$), "4.36" should be 43.6 --. Table II, under the column EXT., "0.2" should be -- .02 --. Column 8, line 68, " 0.0015" " should be -- 0.0015 --. Table IV, in the footnote, "represented" should be -- presented --.

SIGNED AND
SEALED

MAR 3 - 1970

(SEAL)
Attest:

Edward M. Fletcher, Jr.
Attesting Officer

WILLIAM E. SCHUYLER, JR.
Commissioner of Patents